(No Model.)

W. S. BRADEN.
TWINE HOLDER.

No. 530,878. Patented Dec. 11, 1894.

Witnesses:
Jos. H. Blackwood
Robert B. Blackwood

Inventor.
Walter S. Braden
by Wm. H. Doolittle
Attorney.

UNITED STATES PATENT OFFICE.

WALTER S. BRADEN, OF WATSEKA, ILLINOIS.

TWINE-HOLDER.

SPECIFICATION forming part of Letters Patent No. 530,878, dated December 11, 1894.

Application filed July 9, 1894. Serial No. 516,967. (No model.)

*To all whom it may concern:*

Be it known that I, WALTER S. BRADEN, a citizen of the United States of America, residing at Watseka, in the county of Iroquois and State of Illinois, have invented certain new and useful Improvements in Twine-Holders, of which the following is a specification.

My invention relates to an improvement in wrapping twine reels.

The object of my invention is to adapt a simple, spool cylinder for use in stores or other places where wrapping twine is constantly used, and to this end it consists, generally stated, of an open, jointed frame and spool supporting spindle, a spool tension device and a brake, in combination with a spool, all as more fully hereinafter described and particularly claimed.

My invention is illustrated in the accompanying drawings, in which—

Figure 1:
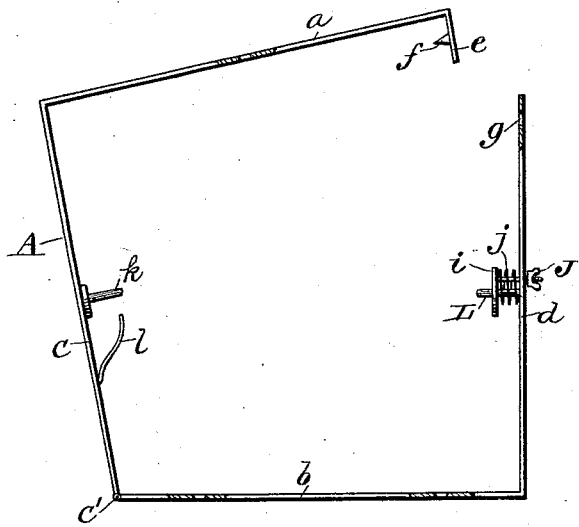
Figure 2:
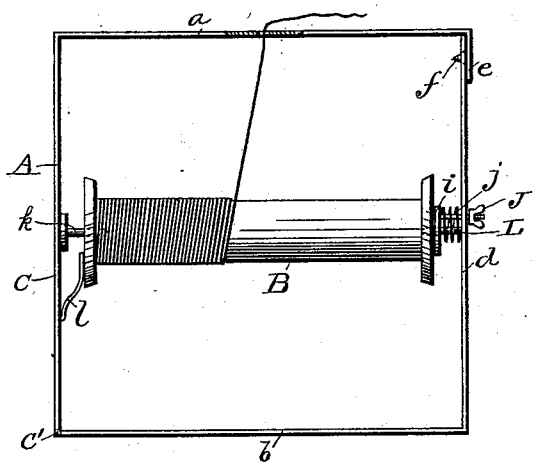
Figure 3:
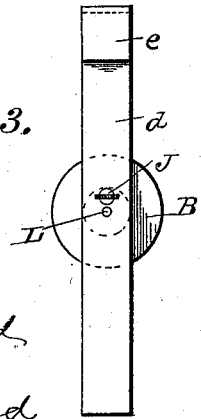

Figure 1 is a front view of the spool frame and its attachments, except the spool, the frame being thrown open; Fig. 2, a similar view showing frame closed, with spool cylinder and twine thereon, in place, and Fig. 3, an end view.

Referring to the drawings, A is a jointed frame consisting of the top, $a$, base $b$, and the two sides, $c$, and, $d$. The top, $a$, is disconnected from one side, $d$, and the side, $c$ connected to the base $d$ by a hinge joint $c'$. The frame A may be made of any suitable material and the shape may be varied without departing from my invention. The base, $b$ is provided with holes to enable the frame to be screwed or otherwise secured to the counter, shelves or other convenient place. The top, $a$, is provided at its open end with a short downwardly xetending arm, $e$, which has secured to it a catch, $f$. The frame is so constructed that the short arm, $e$, will overlap the side, $d$, when the frame is closed and the catch, $f$ is adapted to enter a slot, $g$, formed in the side, $d$, near its top and in this manner to lock the frame. Fixed to the inside of the vertical side, $d$ and about midway of its length, is a spindle, L, which spindle is provided with a movable washer, $i$. The washer, $i$, is secured to the end of a thumb screw, J, which passes through the side of the frame. Interposed between the side, $d$, and the washer, $i$, and surrounding the spindle is a coiled spring, $j$. On the inside of the side, $c$, directly opposite the spindle, L is placed a spindle $k$. The spindles L and $k$ are to support a spool B. A short distance below the spindle $k$, a flat spring brake, $l$, is fastened to the side, $c$, and extends upwardly and inwardly and bears against a face of a flange of the spool.

The spool or bobbin B is of the ordinary kind placed within the frame, A, supported and adapted to revolve on the spindles, L and $k$. The spool B as shown in the drawings is filled with twine with one end of the twine extending up through a small hole in the top, $a$, of the frame.

The operation of my invention may be described as follows: To insert the spool the frame is opened, which is accomplished by releasing the catch $f$ and raising the top $a$, which throws back the top and side on the hinge joint, $c'$. The bobbin may now be easily put in place on its spindles L and $k$. When the spool is in place the tension washer, $i$, will bear against the end of one spool flange and the spring brake, $l$, against the face of the opposite flange. The pressure of the spring $j$ on the washer $i$, and consequently the tension of the spool, against which the washer presses, is regulated by the thumb screw, J, to which the washer, $i$, is attached. The tension may thus be adjusted to the desired strength. The brake spring controls to a certain degree the tension and holds the spool from turning back when the twine is not pulled. The spool and twine being in position in the frame, one end of the twine is passed up through the small hole in the top, $a$, and the device is ready for use.

By the use of my invention the twine does not become tangled while being removed from the bobbin, the bobbin is easily put in place and removed, the action of the springs allows of only a steady feed while the frame is simple, cheap and durable, and by its construction gives easy acccess to its interior for putting on or removing the spool, and for locking the frame when in use.

Having thus described my invention, what I claim is—

1 The herein described twine holder, consisting of the open jointed frame, A, having interior spindles L and $k$, a brake spring, $l$, and a coiled spring, $j$, both adapted to bear against the bobbin B substantially as described.

2. A twine holder, consisting of the frame A, bobbin B, bobbin spindles, L and $k$, brake spring, $l$, and tension spring, $j$, adapted to bear against said bobbin, a washer between said tension spring and the spool and a thumb screw for carrying said washer, and thereby regulating the tension, substantially as described.

3. A twine holder consisting of a frame, A having sides, $a$, $b$, $c$ and $d$, the side $a$ provided with a short arm, $e$, having a catch thereon, said arm, $e$, adapted to overlap the side, $d$, said catch, $f$, adapted to enter a slot in side, $d$, whereby the frame is locked in combination with spindles L and $k$, the springs, $l$ and $j$, and a spool, substantially as described.

In testimony whereof I affix my signature in presence of two witnesses.

WALTER S. BRADEN.

Witnesses:
S. F. SWINFORD,
FRED WILL TOVEY.